US012779430B2

(12) United States Patent
Lee et al.

(10) Patent No.: US 12,779,430 B2
(45) Date of Patent: Nov. 3, 2026

(54) PREPARATION METHOD OF SUPER ABSORBENT POLYMER

(71) Applicant: LG Chem, Ltd., Seoul (KR)

(72) Inventors: Jungmin Lee, Daejeon (KR); Ju Eun Kim, Daejeon (KR); Serin Lee, Daejeon (KR); Hoyong Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 702 days.

(21) Appl. No.: 18/269,842

(22) PCT Filed: Aug. 26, 2022

(86) PCT No.: PCT/KR2022/012787
§ 371 (c)(1),
(2) Date: Jun. 27, 2023

(87) PCT Pub. No.: WO2023/038340
PCT Pub. Date: Mar. 16, 2023

(65) Prior Publication Data

US 2024/0058788 A1 Feb. 22, 2024

(30) Foreign Application Priority Data

Sep. 9, 2021 (KR) ........................ 10-2021-0120263
Aug. 25, 2022 (KR) ........................ 10-2022-0106810

(51) Int. Cl.
*B01J 20/26* (2006.01)
*B01J 20/10* (2006.01)
*B01J 20/28* (2006.01)
*B01J 20/30* (2006.01)

(52) U.S. Cl.
CPC ........... *B01J 20/261* (2013.01); *B01J 20/103* (2013.01); *B01J 20/267* (2013.01); *B01J 20/28004* (2013.01); *B01J 20/3021* (2013.01); *B01J 2220/68* (2013.01)

(58) Field of Classification Search
CPC ...... B01J 20/261; B01J 20/103; B01J 20/267; B01J 20/28004; B01J 20/3021; B01J 2220/68; C08J 2333/02; C08J 3/075; C08J 3/12; C08J 3/245; C08F 2/48; C08F 2/50; C08F 20/06; C08L 33/02; C08K 3/36
See application file for complete search history.

(56) References Cited

U.S. PATENT DOCUMENTS 4,883,478 A 11/1989 Lerailler et al.
5,140,076 A 8/1992 Hatsuda et al.
9,656,242 B2 5/2017 Lee et al.
2015/0315321 A1 11/2015 Won et al.
2017/0165637 A1 6/2017 Park et al.
2018/0185820 A1 7/2018 Tada et al.
2018/0304232 A1 10/2018 Nam et al.
2019/0126240 A1 5/2019 Yoon et al.
2020/0122120 A1 4/2020 Tada et al.
2020/0197909 A1 6/2020 Hwang et al.
2021/0009725 A1 1/2021 Nam et al.
2021/0069674 A1* 3/2021 Jung .......................... C08J 3/24
2021/0102031 A1 4/2021 Lim et al.
2022/0234027 A1 7/2022 Seo et al.

FOREIGN PATENT DOCUMENTS

EP 3279238 A1 2/2018
EP 3279241 A1 2/2018
EP 3333198 A1 6/2018
JP 2002226599 A 8/2002
JP 6457067 B2 1/2019
JP 2021517603 A 7/2021
KR 100143402 B1 7/1998
KR 101471982 B1 12/2014
KR 20170098196 A 8/2017
KR 20180100871 A 9/2018
KR 20190069101 A 6/2019
KR 20190069311 A 6/2019
KR 20210041516 A 4/2021
KR 20210049869 A 5/2021
WO 8703208 A1 6/1987
WO 2015084059 A1 6/2015
WO 2020067310 A1 4/2020
WO 2021071246 A1 4/2021

OTHER PUBLICATIONS

Extended European Search Report including Written Opinion for Application No. 22867609.4 dated May 27, 2024, pp. 1-8.
International Search Report for PCT/KR2022/012787 mailed Dec. 2, 2022. 3 pages.
Schwalm, R. "UV Coatings Basics, Recent Developments and New Application," Elsevier Science, Dec 21, 2006, p. 115. (3 pgs.).
Odian, G. "Principles of Polymerization" Dec 1981, p. 203, Wiley Interscience Publication. (3 pgs.).

* cited by examiner

*Primary Examiner* — Daniel Berns
*Assistant Examiner* — Joshua Maxwell Speer
(74) *Attorney, Agent, or Firm* — Lerner David LLP

(57) ABSTRACT

This invention relates to a method for preparing super absorbent polymer, where wherein colloidal silica is added during coarse grinding, and/or silica is introduced during surface crosslinking. According to the preparation method of super absorbent polymer of the invention, super absorbent polymer that maintains excellent absorption properties, and simultaneously, exhibits improved vortex time and anti-caking efficiency, can be provided.

16 Claims, No Drawings

PREPARATION METHOD OF SUPER ABSORBENT POLYMER

CROSS-REFERENCE TO RELATED APPLICATION

This application is a national stage entry under 35 U.S.C. § 371 of International Application No. PCT/KR2022/012787 filed on Aug. 26, 2022, which claims the priority from Korean Patent Applications No. 10-2021-0120263 filed on Sep. 9, 2021, and No. 10-2022-0106810 filed on Aug. 25, 2022, all the disclosures of which are herein incorporated by reference.

BACKGROUND OF THE INVENTION

(a) Field of the Invention

This invention relates to a method for preparing super absorbent polymer. More specifically, this invention relates to a method for preparing super absorbent polymer exhibiting improved vortex time and anti-caking efficiency.

(b) Description of the Related Art

Super absorbent polymer (SAP) is synthetic polymer material that can absorb moisture of 500 to 1000 times of self-weight, and is also named as super absorbency material (SAM), absorbent gel material (AGM), etc. according to developing companies. The super absorbent polymer began to be commercialized as sanitary items, and currently, it is being widely used as water-holding material for soil, water stop material for civil engineering and architecture, sheets for raising seedling, freshness preservatives in the field of food circulation, fomentation material, and the like, besides hygienic goods such as paper diapers for children or sanitary pads, and the like.

In most cases, such super absorbent polymer is being widely used in the field of hygienic goods such as a diaper or sanitary pad, etc., and for such use, it is required to exhibit high absorption power to moisture, and the like, and the absorbed moisture should not escape even under external pressure, and besides, it should properly maintain the shape even when it absorbs water and the volume is expanded (swollen), thus exhibiting excellent permeability.

However, it is known that centrifuge retention capacity (CRC) indicating the basic absorption power and water retention power of super absorbent polymer, and absorbency under pressure (AUP) indicating the property of retaining absorbed moisture despite the external pressure are difficult to be simultaneously improved. In case the whole crosslinking density of super absorbent polymer is controlled low, centrifuge retention capacity may become relatively high, but the crosslink structure may become loose, and gel strength may decrease, thus deteriorating absorption under pressure. To the contrary, in case the crosslinking density is controlled high to improve absorption under pressure, it may become difficult to absorb moisture between the dense crosslink structures, thus deteriorating centrifuge retention capacity. For these reasons, there is a limit in providing super absorbent polymer having simultaneously improved centrifuge retention capacity and absorbency under pressure.

However, with the recent thinning of hygienic goods such as diapers and sanitary pads, super absorbent polymer is required to have higher absorption performances. Among them, it is an important problem to simultaneously improve the conflicting properties of centrifuge retention capacity and absorbency under pressure, and improve permeability, and the like.

Meanwhile, since the super absorbent polymer is included in hygienic products such as diapers, it is often exposed to high temperature/high humidity conditions. However, in case super absorbent polymer is exposed to high temperature/high humidity conditions, aggregation and/or caking between particles may often occur. In case such aggregation and/or caking is generated, load may increase in the process of preparation and use, thus decreasing processability, and causing difficulty in use of super absorbent polymer.

Thus, there have been attempts to decrease caking between particles by treating the surfaces of super absorbent polymer particles with inorganic particles such as silica, but technical demands therefor have not been sufficiently satisfied.

SUMMARY OF THE INVENTION

In order to solve the problems of the prior art, it is an object of the invention to provide a method for preparing super absorbent polymer enabling preparation of super absorbent polymer exhibiting excellent absorption performances, improved vortex time and anti-caking efficiency.

In order to achieve the object, according to one aspect of the invention, there is provided a method for preparing super absorbent polymer comprising steps of:

- conducting photopolymerization or thermal polymerization for a monomer composition comprising acrylic acid-based monomers having acid groups, at least a part of said acid groups being neutralized, an internal crosslinking agent, and a polymerization initiator to form hydrogel polymer;
- mixing the hydrogel polymer with colloidal silica to coarsely grind;
- drying, grinding and classifying the coarsely ground hydrogel polymer to form base resin; and
- crosslinking the surface of the base resin additionally, in the presence of one of colloidal silica or fumed silica, and a surface crosslinking agent, to form a surface crosslink layer.

According to the preparation method of super absorbent polymer of the invention, super absorbent polymer that maintains excellent absorption properties, and simultaneously, exhibits improved vortex time and anti-caking efficiency, can be provided.

DETAILED DESCRIPTION OF THE EMBODIMENTS

Although various modifications can be made to the invention and the invention may have various forms, specific examples will be illustrated and explained in detail below. However, it should be understood that these are not intended to limit the invention to specific disclosure, and that the invention includes all the modifications, equivalents or replacements thereof without departing from the spirit and technical scope of the invention.

Hereinafter, a preparation method of super absorbent polymer according to one embodiment of the invention will be explained in detail.

The preparation method of super absorbent polymer according to one embodiment of the invention comprises steps of:

- conducting photopolymerization or thermal polymerization for a monomer composition comprising acrylic acid-based monomers having acid groups, at least a part of said acid groups being neutralized, an internal crosslinking agent, and a polymerization initiator to form hydrogel polymer;

mixing the hydrogel polymer with colloidal silica to coarsely grind;

drying, grinding and classifying the coarsely ground hydrogel polymer to form base resin; and crosslinking the surface of the base resin additionally, in the presence of one of colloidal silica or fumed silica, and a surface crosslinking agent, to form a surface crosslink layer.

Throughout the specification, "base resin" or "base resin powder" refers to polymer polymerized from acrylic acid monomers and dried and ground to particles or powders, wherein surface modification or surface crosslinking step described later is not conducted.

Hydrogel polymer obtained by the polymerization reaction of acrylic acid-based monomers is passed through processes of drying, grinding, classification, surface crosslinking, and the like, and commercialized as super absorbent polymer powder products.

Meanwhile, recently, the maintenance time of dryness of the surface of swollen super absorbent polymer during practical use of diapers, as well as absorption properties such as absorption capacity and permeability, is becoming an important criterion for assessing the properties of diapers. And, there are many factors affecting such dryness, and among them, gel degradation by ascorbic acid in urine is pointed out as the most important factor. Namely, as ascorbic acid included in urine reacts with the polymer structure of super absorbent polymer and decomposes the polymer structure, extractable contents increase, which is one of main causes of degradation phenomenon wherein super absorbent polymer or diaper becomes sticky.

Thus, the invention is based on the discovery of the inventors that by mixing colloidal silica and conducting coarse grinding in the coarse grinding step of polymer, the strength of super absorbent polymer may increase, thereby effectively preventing degradation by ascorbic acid.

It was also confirmed that by conducting surface crosslinking in the presence of colloidal silica or fumed silica in the surface crosslinking step, caking phenomenon wherein super absorbent polymer particles are aggregated with each other under high temperature high moisture environment, can be effectively prevented.

As the results, super absorbent polymer obtained by the preparation method according to one embodiment of the invention may have excellent properties such as centrifuge retention capacity, absorbency under pressure, permeability, vortex time, and the like, and exhibit anti-caking effect.

Hereinafter, it will be explained in more detail.

In the preparation method of super absorbent polymer of the invention, first, photopolymerization or thermal polymerization for a monomer composition comprising acrylic acid-based monomers having acid groups, at least a part of said acid groups being neutralized, an internal crosslinking agent, and a polymerization initiator is conducted to form hydrogel polymer.

The monomer composition, which is raw material of the super absorbent polymer, comprises acrylic acid-based monomers having acid groups, at least a part of said acid groups being neutralized, an internal crosslinking agent, and a polymerization initiator.

The acrylic acid-based monomer is a compound represented by the following Chemical Formula 1:

$R^1$—$COOM^1$ [Chemical Formula 1]

$R^1$ is a C2-5 alkyl group comprising unsaturated bond,

M' is a hydrogen atom, monovalent or divalent metal, an ammonium group or an organic amine salt.

Preferably, the monomer comprises one or more selected from the group consisting of acrylic acid, methacrylic acid, and monovalent metal salt, divalent metal salt, ammonium salt and organic amine salt thereof.

Wherein, the acrylic acid-based monomer has acid groups, and at least a part of the acid groups may be neutralized. Preferably, the monomers may be partially neutralized with alkali substances such as sodium hydroxide, potassium hydroxide, ammonium hydroxide, and the like before use. Wherein, the degree of neutralization of the acrylic acid-based monomers may be 40 to 95 mol %, or 40 to 80 mol %, or 45 to 75 mol %. The range of neutralization degree may be controlled according the final properties. However, if the degree of neutralization is too high, neutralized monomers may be extracted, and thus, it may be difficult to smoothly progress polymerization, and to the contrary, if the degree of neutralization is too low, absorption force of polymer may be significantly lowered, and the polymer may exhibit elastic rubber-like properties, which are difficult to handle.

The concentration of the acrylic acid-based monomers may be about 20 to about 60 wt %, preferably about 40 to about 50 wt %, based on the monomer composition comprising the raw materials of the super absorbent polymer and a solvent, and it may be appropriately controlled considering a polymerization time and reaction conditions, and the like. However, if the concentration of the monomers is too low, yield of super absorbent polymer may be low, thus causing a problem in terms of economic feasibility, and to the contrary, if the concentration is too high, a part of the monomers may be extracted, or grinding efficiency of hydrogel polymer may be low, thus causing process problems, and the properties of super absorbent polymer may be deteriorated.

A polymerization initiator used for polymerization in the preparation method of super absorbent polymer of the invention is not specifically limited as long as it is commonly used in the preparation of super absorbent polymer.

Specifically, as the polymerization initiators, thermal polymerization initiators or photo polymerization initiators, and the like may be used according to polymerization method. However, even in the case of photo polymerization, since a certain amount of heat is generated by UV irradiation, and the like, and heat is generated to some degree according to the progression of the exothermic polymerization reaction, a thermal polymerization initiator may be additionally included.

The photopolymerization initiator may be used without limitations in terms of its constructions, as long as it is a compound capable of forming radicals by light such as UV.

As the photo polymerization initiators, for example, one or more compounds selected from the group consisting of benzoin ether, dialkyl acetophenone, hydroxyl alkylketone, phenyl glyoxylate, benzyl dimethyl ketal, acyl phosphine and α-aminoketone may be used. Among them, as specific examples of the acyl phosphine, lucirin TPO, i.e., 2,4,6-trimethyl-benzoyl-trimethyl phosphine oxide may be used. More various photo initiators are stated in Reinhold Schwalm, "UV Coatings: Basics, Recent Developments and New Application(Elsevier 2007)" p 115, and are not limited to the above examples.

The photopolymerization initiator may be included in the concentration of 0.001 to 5 parts by weight or 0.01 to 1.0 parts by weight, based on the monomer composition. If the concentration of the photopolymerization initiator is too low, polymerization speed may become slow, and if the concentration of the photopolymerization initiator is too high, the molecular weight of superabsorbent polymer may be low and the properties may become non-uniform.

As the thermal polymerization initiator, one or more selected from the group consisting of persulfate-based initiators, azo-based initiators, hydrogen peroxide and ascorbic acid may be used. Specifically, as the examples of the persulfate-based initiators, sodium persulfate($Na_2S_2O_8$), potassium persulfate($K_2S_2O_8$), ammonium persulfate ($(NH_4)_2S_2O_8$), and the like, may be mentioned, and as the examples of the azo-based initiators, 2,2-azobis(2-amidinopropane) dihydrochloride, 2,2-azobis-(N,N-dimethylene) isobutyramidine dihydrochloride, 2-(carbamoylazo)isobutylonitrile, 2,2-azobis[2-(2-imidazolin-2-yl)propane] dihydrochloride, 4,4-azobis-(4-cyanovaleric acid), and the like may be mentioned. More various thermal polymerization initiators are stated in Odian, 'Principle of polymerization (Wiley, 1981)', p 203, but the invention is not limited thereto.

According to one embodiment of the invention, the monomer composition comprises an internal crosslinking agent as the raw material of super absorbent polymer. As the internal crosslinking agent, crosslinking agents that have one or more functional groups capable of reacting with the acrylic acid-based monomers, and simultaneously, have one or more ethylenically unsaturated groups; or crosslinking agents that have 2 or more functional groups capable of reacting with the substituents of the acrylic acid-based monomers and/or substituents formed by hydrolysis of the monomers, may be used.

As specific examples of the internal crosslinking agent, one or more selected from the group consisting of N,N'-methylenebisacrylamide, trimethylolpropane tri(meth)acrylate, ethyleneglycol di(meth)acrylate, polyethyleneglycol (meth)acrylate, propyleneglycol di(meth)acrylate, polypropyleneglycol (meth)acrylate, butanediol di(meth)acrylate, butyleneglycol di(meth)acrylate, diethyleneglycol di(meth) acrylate, hexanediol di(meth)acrylate, triethyleneglycol di(meth)acrylate, tripropyleneglycol di(meth)acrylate, tetraethyleneglycol di(meth)acrylate, dipentaerythritol pentaacrylate, glycerin tri(meth)acrylate, pentaerythritol tetraacrylate, triarylamine, ethyleneglycol diglycidyl ether, propyleneglycol, glycerin, and ethylenecarbonate may be used.

Such an internal crosslinking agent may be included at the concentration of about 0.01 to about 0.5 wt %, based on the monomer composition, to crosslink the polymerized polymer.

In the preparation method of the invention, the monomer composition may further comprise additives such as a thickener, a plasticizer, a preservative, an antioxidant, and the like, as necessary.

The raw materials such as above-explained acrylic acid-based monomers having at least partially neutralized acid groups, photopolymerization initiator, thermal polymerization initiator, internal crosslinking agent and additives may be prepared in the form of a monomer composition solution dissolved in a solvent.

Wherein, a solvent that can be used is not limited as long as it can dissolve the above explained raw materials, and for example, water, ethanol, ethyleneglycol, diethyleneglycol, triethyleneglycol, 1,4-butanediol, propyleneglycol, ethyleneglycol monobutyl ether, propyleneglycol monomethyl ether, propyleneglycol monomethyl ether acetate, methylethylketone, acetone, methylamylketone, cyclohexanone, cyclopentanone, diethyleneglycol monomethyl ether, diethyleneglycol ethyl ether, toluene, xylene, butyrolactone, carbitol, methyl celosolve acetate and N,N-dimethylacetamide or mixtures thereof may be used.

The solvent may be included in the remaining amount except the above explained components, based on the total content of the monomer composition.

Meanwhile, a method of thermal polymerization or photopolymerization of such a monomer composition to form hydrogel polymer is not specifically limited in terms of its constructions, as long as it is a commonly used polymerization method.

Specifically, the polymerization method is largely divided into thermal polymerization and photopolymerization according to a polymerization energy source, and commonly, thermal polymerization may be progressed in a reactor equipped with a stirring axis such as a kneader, and photopolymerization may be progressed in a reactor equipped with a movable conveyor belt or in a flat-bottom container, but the above explained polymerization method is no more than one example, and the invention is not limited thereto.

For example, hydrogel polymer may be obtained by introducing the monomer composition into a reactor equipped with a stirring axis such as a kneader as explained above, and supplying hot air or heating the reactor to progress thermal polymerization. Wherein, the hydrogel polymer discharged to the outlet of the reactor may be in the size of a few centimeters to a few millimeters according to the shape of the stirring axis equipped in the reactor. Specifically, the size of obtained hydrogel polymer may vary according to the concentration of the introduced monomer composition and the introduction speed, and the like, and commonly, hydrogel polymer with particle diameter of 2 to 50 mm may be obtained.

And, in case photopolymerization of the monomer composition is progressed in a reactor equipped with a movable conveyer belt as explained above, hydrogel polymer obtained may be commonly a hydrogel polymer sheet having a width of the belt. Wherein, the thickness of the sheet may vary according to the concentration of the introduced monomer composition and the introduction speed, but it is preferable that the monomer composition is supplied so as to obtain a polymer sheet with a thickness of about to 0.5 to about 5 cm. In case the monomer composition is fed such that the thickness of a polymer sheet may become too thin, production efficiency may be low, and if the thickness of a polymer sheet is greater than 5 cm, due to too thick thickness, polymerization may not uniformly occur over the entire thickness.

The moisture content of hydrogel polymer thus obtained may be commonly 40 to 80 wt %. Throughout the specification, the "moisture content" is the content of moisture occupied based on the total weight of hydrogel polymer, and it means a value obtained by subtracting the weight of polymer of a dry state from the weight of hydrogel polymer. Specifically, it is defined as a value calculated by measuring the weight loss according to moisture evaporation in the polymer while raising the temperature of polymer through infrared heating to dry. Wherein, the temperature is raised from room temperature to about 180° C. and then maintained at 180° C., and the total drying time is 20 minutes including a temperature raising step of 5 minutes.

Next, a step of mixing the hydrogel polymer with colloidal silica and coarsely grinding is conducted.

The colloidal silica refers to silica that is stably dispersed in water without precipitation or aggregation of silica particles, and it refers to silica wherein at least a part of the surfaces of silica particles are ionized. A preparation method of the colloidal silica is not specifically limited, and those prepared by known preparation methods such as electrodialysis, sol-gel method, ion exchange, acid-neutralization, and the like may be used.

The colloidal silica may be added in the content of 0.01 parts by weight or more, or 0.02 parts by weight or more, or 0.03 parts by weight or more, or 0.05 parts by weight or more, or 0.08 parts by weight or more, or 0.1 parts by weight or more, and 1.0 parts by weight or less, or 0.8 parts by weight or less, or 0.5 parts by weight or less, or 0.2 parts by weight or less, based on 100 parts by weight of the hydrogel polymer. When the content of the colloidal silica is within the above range, gel strength improvement effect can be achieved without deterioration of the absorption properties of super absorbent polymer, and thus, the above range is preferable.

And, if the colloidal silica fails to maintain a colloid state and is extracted while ground together with hydrogel polymer, gel strength improvement effect may not be obtained, and thus, it is preferable to use colloidal silica maintaining a stable colloid state. Thus, non-colloidal powder or hydrophobic silica does not exhibit gel strength improvement effect, and cannot achieve the effect intended in the invention.

As colloidal silica meeting such requirements, ST-30, ST-O, ST-N, ST-C or ST-AK, and the like from Nissan Chemical Corporation may be mentioned, but the invention is not limited thereto.

According to the preparation method of the invention, by adding the above explained colloidal silica during coarse grinding and conducting coarse grinding in the presence of the colloidal silica, the hydrogel polymer and colloidal silica may be uniformly mixed and distributed, and thus, gel strength of hydrogel polymer may be improved, and such an effect may be also maintained for base resin and the final super absorbent polymer, and thus, degradation by ascorbic acid may be improved.

Wherein, grinders that can be used in the coarse grinding process are not limited in terms of the constructions, but specifically, one selected from the group consisting of a vertical pulverizer, a turbo cutter, a turbo grinder, a rotary cutter mill, a cutter mill, a disc mill, a shred crusher, a crusher, a chopper, a disc cutter may be used, but the invention is not limited thereto.

Wherein, the coarse grinding may be conducted such that the particle diameter of hydrogel polymer may become about 2 to 10 mm.

Grinding to a particle diameter less than 2 mm would not be technologically easy due to the high moisture content of hydrogel polymer, and may cause aggregation between ground particles. Meanwhile, if coarse ground to a particle diameter greater than 10 mm, the effect of increasing the efficiency of a drying step conducted later may be insignificant.

Next, a step of drying, grinding and classifying the coarsely ground hydrogel polymer to form base resin is conducted.

The drying temperature of the drying step may be about 150 to about 250° C. If the drying temperature is less than 150° C., drying time may too lengthen, and the properties of the finally prepared superabsorbent polymer may be deteriorated, and if the drying temperature is greater than 250° C., only the surface of polymer may be dried, and thus, fine particles may be generated in the grinding process conducted later, and the properties of the finally prepared superabsorbent polymer may be deteriorated. Thus, the drying may be preferably progressed at a temperature of about 150 to about 200° C., more preferably at a temperature of about 160 to about 180° C.

Meanwhile, the drying may be progressed for about 20 minutes to about 90 minutes considering process efficiency, but the drying time is not limited thereto.

And, the drying method is not limited as long as it is commonly used as a drying process of hydrogel polymer. Specifically, the drying may be progressed by hot air supply, infrared irradiation, microwave irradiation or UV irradiation, and the like. The moisture content of polymer after the drying step may be about 0.1 to about 10 wt %.

Next, dried polymer obtained through such a drying step is ground.

Grinding may be conducted such that the particle diameter of polymer powder obtained after the grinding step may become 150 to 850 μm. As a grinder used to grind to such a particle diameter, specifically, a ball mill, a pin mill, a hammer mill, a screw mill, a roll mill, a disc mill or a jog mill, and the like may be used, but the invention is not limited thereto.

And, in order to manage the properties of super absorbent polymer powder finally productized after the grinding step, a separate process of classifying polymer powder obtained after grinding according to particle diameter may be conducted, and classification may be conducted such that the super absorbent polymer may comprise polymer powders having certain particle diameters at a certain weight ratio.

The classification process may be conducted according to a common method such as using a standard sieve according ASTM regulation, and through such a classification process, fine particles having particle diameters less than 150 μm and coarse particles greater than 850 μm may be separated and removed, and normal particles of super absorbent polymer having particle diameters of 150 to 850 μm may be obtained.

Polymer polymerized from acrylic acid-based monomers, and dried and ground to particles or powders by the above explained processes is referred to as base resin.

The base resin of the invention may have centrifuge retention capacity (CRC) measured according to EDANA method WSP 241.3, of 45 g/g or more, or 50 g/g or more, or 51 g/g or more, or 52 g/g or more, and 60 g/g or less, or 58 g/g or less, or about 55 g/g or less.

In the surface crosslinking step described later, centrifuge retention capacity (CRC) of base resin is inevitably lowered, but according to the invention, by forming base resin with high retention capacity, centrifuge retention capacity of the final product may be still maintained high.

And, the base resin of the invention may have high gel strength, measured according to tension and compression test, of 0.1 N or more, or 0.12 N or more, or 0.14 N or more, or 0.15 N or more, and 0.20 N or less, or 0.19 N or less, or 0.18 N or less.

Next, a step of additionally crosslinking the surface of the base resin in the presence of one of colloidal silica or fumed silica, and a surface crosslinking agent, to form a surface crosslink layer is conducted.

In the common preparation method of super absorbent polymer, dried and ground polymer, i.e., base resin is mixed with a surface crosslinking solution comprising a surface crosslinking agent, and then, the mixture is heated to raise a temperature, thus conducting a surface crosslinking reaction for the ground polymer.

The surface crosslinking step induces a crosslinking reaction on the surface of the ground polymer in the presence of a surface crosslinking agent, thereby forming super absorbent polymer having further improved properties. Through such surface crosslinking, a surface crosslink layer (surface modification layer) is formed on the surface of the ground base resin.

In general, since a surface crosslinking agent is applied on the surface of super absorbent polymer particles, a surface crosslinking reaction occurs on the surface of super absorbent polymer particles, which does not substantially affect the inside of particles, but improves crosslinkability on the surface of particles. Thus, surface-crosslinked super absorbent polymer particles have higher crosslinking degree around the surface than inside.

According to the preparation method of the invention, in the step of mixing a surface crosslinking agent with base resin and conducting a surface crosslinking reaction, hydrophobic colloidal silica, or fumed silica is additionally mixed and a surface crosslinking reaction is conducted. Thereby, colloidal silica or fumed silica is included in the crosslink structure on the surface crosslink layer, and thereby, surface crosslinking efficiency may be improved, and compared to super absorbent polymer without using the same, permeability may be further improved, and furthermore, caking phenomenon wherein super absorbent polymer particles are aggregated with each other under high temperature high moisture environment may be effectively prevented.

More specifically, the colloidal silica or fumed silica is distributed in the surface modification layer on the surface of base resin and prevents aggregation or agglomeration of swollen polymer particles due to increased pressure while super absorbent polymer absorbs liquid and is swollen, and gives appropriate hydrophobicity to the surface, thereby further facilitating penetration and diffusion of liquid. Thus, it can contribute to improvement in the vortex time, permeability and anti-caking property of super absorbent polymer.

As the colloidal silica, ST-30, ST-O, ST-N, ST-C or ST-AK, and the like from Nissan Chemical Corporation may be mentioned, but the invention is not limited thereto.

As the fumed silica, for example, silica available as a product name of Aerosil, Tixosil or DM30S, and the like may be mentioned, but the invention is not limited thereto.

The colloidal silica or fumed silica may be added in the content of 0.01 parts by weight or more, or 0.02 parts by weight or more, or 0.03 parts by weight or more, or 0.05 parts by weight or more, or 0.08 parts by weight or more, or 0.1 parts by weight or more, and 1.0 parts by weight or less, or 0.8 parts by weight or less, or 0.5 parts by weight or less, or 0.2 parts by weight or less, based on 100 parts by weight of the base resin. When the content of the colloidal silica or fumed silica is within the above range, permeability and anti-caking effect may be achieved without deterioration of absorption properties of super absorbent polymer, and thus, the above range may be preferable.

A method of mixing the colloidal silica or fumed silica is not specifically limited as long as it can uniformly mix it with the base resin.

For example, the colloidal silica or fumed silica may be dry mixed before mixing the base resin with a surface crosslinking solution comprising a surface crosslinking agent, or it may be dispersed first in the surface crosslinking solution and mixed with the base resin together with the surface crosslinking solution.

When adding the surface crosslinking agent, it may be added in the form of a surface crosslinking solution by additionally mixing water together. In case water is added, the surface crosslinking agent may be uniformly dispersed in the polymer. Wherein, it is preferable that water is added in the content of about 1 to about 10 parts by weight, based on 100 parts by weight of base resin, so as to induce uniform dispersion of the surface crosslinking agent, prevent agglomeration of polymer powders, and simultaneously, optimize the surface penetration depth of the surface crosslinking agent.

And, the surface crosslinking agent is not limited as long as it is a compound capable of reacting with the functional groups of polymer.

Preferably, in order to improve the properties of prepared super absorbent polymer, as the surface crosslinking agent, one or more selected from the group consisting of polyhydric alcohol compounds; epoxy compounds; polyamine compounds; haloepoxy compounds; condensation products of haloepoxy compounds; oxazoline compounds; mono-, di- or polyoxazolidinone compounds; cyclic urea compounds; multivalent metal salt; and alkylene carbonate compounds may be used.

Specifically, as examples of the polyhydric alcohol compounds, one or more selected from the group consisting of mono-, di-, tri-, tetra- or polyethylene glycol, monopropylene glycol, 1,3-propanediol, dipropylene glycol, 2,3,4-trimethyl-1,3-pentanediol, polypropylene glycol, glycerol, polyglycerol, 3-butene-1,4-diol, 1,4-butanediol, 1,3-butanediol, 1,5-pentanediol, 1,6-hexanediol, and 1,2-cyclohexanedimethanol may be used.

And, as the epoxy compounds, ethylene glycol diglycidyl ether and glycidol, and the like may be used, and as the polyamine compounds, one or more selected from the group consisting of ethylenediamine, diethylenetriamine, triethylenetetramine, tetraethylenepentamine, polyethyleneimine and polyamide polyamine may be used.

And, as the haloepoxy compounds, epichlorohydrin, epibromohydrin and α-methyl epichlorohydrin may be used. Meanwhile, as the mono-, di- or polyoxazolidinone compounds, for example, 2-oxazolidinone, and the like may be used.

And, as the alkylene carbonate compounds, ethylene carbonate, and the like may be used. These compounds may be used alone or in combinations. Meanwhile, in order to increase the efficiency of the surface crosslinking process, among the surface crosslinking agents, one or more kinds of C2-10 polyhydric alcohol compounds may be included.

The content of the surface crosslinking agent added may be appropriately selected according to the kind of the surface crosslinking agent or reaction conditions, but commonly, it may be 0.001 to 5 parts by weight, preferably 0.01 to 3 parts by weight, more preferably 0.05 to 2 parts by weight, based on 100 parts by weight of base resin.

If the content of the surface crosslinking agent is too small, a surface crosslinking reaction may hardly occur, and if it is greater than 5 parts by weight, based on 100 parts by weight of base resin, due to progression of excessive surface crosslinking reactions, absorption capacity and properties may be deteriorated.

Meanwhile, beside the above explained surface crosslinking agent, multivalent metal salts, for example, aluminum salt, more specifically, one or more selected from the group consisting of sulfate, potassium salt, ammonium salt, sodium salt and hydrochloride of aluminum may be further included.

By additionally using such multivalent metal salts, permeability of super absorbent polymer prepared by the method of one embodiment may be further improved. Such multivalent metal salts may be added to the surface crosslinking solution together with the surface crosslinking agent, and it may be used in the content of 0.01 to 4 parts by weight, based on 100 parts by weight of the base resin.

The step of additionally crosslinking the surface of the base resin to form a surface crosslink layer is conducted by heating the mixture of colloidal silica or fumed silica, base resin, and surface crosslinking agent to raise the temperature.

The temperature may be increased by heating at a temperature of about 80 to about 190° C., preferably about 100 to about 180° C., more preferably about 110 to about 140° C., for about 10 to about 90 minutes, preferably about 20 to about 70 minutes. If a crosslinking reaction temperature is too low or a reaction time is too short, a surface crosslinking reaction may not sufficiently occur, and thus, permeability may be lowered, and to the contrary, if a temperature is too high or a reaction time is too long, centrifuge retention capacity may be deteriorated.

A temperature rise means for the surface crosslinking is not specifically limited, and a heat transfer medium may be supplied or a heat source may be directly supplied for heating. Wherein, as the heat transfer medium that can be used, steam, hot air, temperature-raised fluid such as hot oil may be used, and the temperature of supplied heat transfer medium may be appropriately selected considering the heat transfer medium, temperature rise means and target temperature. Meanwhile, as the heat source directly supplied, electric heating or gas heating may be mentioned, but is not limited thereto.

According to the preparation method of the invention, due to colloidal silica added during coarse grinding, base resin has excellent gel strength, and due to colloidal silica or fumed silica added during the surface crosslinking step, a surface crosslink layer in which silica is distributed in the surface crosslink structure, may be formed.

Thus, the super absorbent polymer prepared according to the preparation method of the invention may have such properties of the base resin, and have improved vortex time, permeability and anti-caking property without deteriorating properties such as centrifuge retention capacity, absorbency under pressure, and the like, due to the surface crosslink layer formed on the base resin.

Thus, the super absorbent polymer prepared according to the preparation method of the invention may have centrifuge retention capacity (CRC) measured according to EDANA method WSP 241.3, of 35 g/g or more, or 36 g/g or more, or 37 g/g or more, and 45 g/g or less, or 43 g/g or less, or 40 g/g or less.

And, the super absorbent polymer prepared according to the preparation method of the invention may have absorbency under pressure (AUP) of 0.7 psi, measured according to EDANA method WSP 242.3, of 20 g/g or more, or 21 g/g or more, and 30 g/g or less, or 28 g/g or less, or 26 g/g or less.

And, the super absorbent polymer prepared according to the preparation method of the invention may have a vortex time according to a vortex method, of 45 seconds or less, or 43 seconds or less, or 42 seconds or less, or 41 seconds or less. Since the smaller vortex time is more excellent, the theoretical lower limit of the vortex time is 0 second, but for example, it may be 5 seconds or more, or 10 seconds or more, or 20 seconds or more.

The vortex time means a time (unit: seconds) taken until vortex of liquid disappears by rapid absorption, when super absorbent polymer is added to a physiological saline and stirred, and as the time is shorter, it may be considered that the super absorbent polymer has more rapid initial absorption speed.

And, the super absorbent polymer prepared according to the preparation method of the invention may have permeability (unit: seconds) of 50 seconds or less, or 48 seconds or less, or 46 seconds or less, or 45 seconds or less. As the permeability value is smaller, permeability is more excellent, and the theoretical lower limit is 0 second, but for example, it may be 10 seconds or more, or 20 seconds or more, or 30 seconds or more.

A measurement method of permeability will be explained in more detail in Examples described later.

And, the super absorbent polymer prepared according to the preparation method of the invention may have anti-caking efficiency of 88.0% or more, or 88.5% or more, or 89.0% or more, or 89.5% or more, and 95.0% or less, or 94.0% or less, or 93.0% or less, or 92.0% or less.

A measurement method of anti-caking efficiency will be explained in more detail in Examples described later.

And, the super absorbent polymer prepared according to the preparation method of the invention may have high gel strength, measured according to tension and compression test, of 0.70 N or more, or 0.72 N or more, or 0.74 N or more, or 0.75 N or more, and 0.90 N or less, or 0.85 N or less, or 0.80 N or less.

A measurement method of gel strength will be explained in more detail in Examples described later.

And, the super absorbent polymer prepared according to the preparation method of the invention may meet one or more, preferably two or more of the above-explained property ranges of centrifuge retention capacity (CRC), absorbency under pressure (AUP) of 0.7 psi, vortex time, permeability, anti-caking efficiency and gel strength, and more preferably, it may simultaneously meet all the property ranges.

As such, the super absorbent polymer of the invention may have excellent absorption capacity, and exhibit improved vortex time, permeability and anti-caking property.

Hereinafter, the actions and effects of the invention will be explained in detail through specific examples of the invention. However, these examples are presented only as the illustrations of the invention, and the scope of the right of the invention is not determined thereby.

EXAMPLE

Preparation of Super Absorbent Polymer

Example 1

In a 2 L glass container equipped with a stirrer and a thermometer, 507.8 g of acrylic acid, 0.3 g of ethyleneglycol diglycidyl ether (EGDGE) as an internal crosslinking agent, 0.04 g of bis(2,4,6-trimethylbenzoyl)phenyl phosphine oxide as a photoinitiator, 0.76 g of sodium persulfate (SPS) as a thermal initiator, 627.1 g of 31.5% sodium hydroxide aqueous solution, 0.51 g of sodium dodecyl sulfate (SDS) as a surfactant, and 238.7 g of distilled water were mixed to prepare an aqueous solution of water soluble unsaturated monomers (neutralization degree: 70 mol %; solid content: 41 wt %).

Thereafter, when the temperature of the monomer aqueous solution became 43° C., it was irradiated by UV for 1 minute (intensity: 10 mW/cm$^2$) to conduct UV polymerization, and maintained in a polymerization reactor for 2 minutes to obtain hydrogel polymer. Based on 100 parts by weight of the obtained hydrogel polymer, 0.1 parts by weight of colloidal silica was added, and the hydrogel polymer was ground to 2 mm*2 mm, and then, moisture content (drying at 180° C. for 40 minutes) was measured to be 53%.

The obtained hydrogel polymer was spread on a stainless wire gauze having a hole size of 600 μm to a thickness of about 30 mm, and dried in a 180° C. hot air oven for 30 minutes. The obtained dried polymer was ground using a grinder, and classified with a ASTM standard sieve to obtain base resin having particle size of 150 to 850 μm.

Thereafter, a surface treatment solution comprising, based on 100 parts by weight of the prepared base resin, 5.8 parts by weight of water, 3 parts by weight of methanol, 0.5 parts by weight of propylene glycol, 0.1 parts by weight of ethyleneglycol diglycidyl ether (EDGGE), and 0.05 parts by weight of colloidal silica was uniformly mixed, and then, fed to a surface crosslinking reactor, and a surface crosslinking reaction of the base resin was progressed at 130° C. for 40 minutes.

After completing the surface treatment, surface treated super absorbent polymer having particle size of 150 to 850 μm was obtained using a sieve.

Example 2

Super absorbent polymer was prepared by the same method as Example 1, except that 0.05 parts by weight of fumed silica was added instead of colloidal silica during surface crosslinking in Example 1.

Example 3

Super absorbent polymer was prepared by the same method as Example 1, except that 0.03 parts by weight of colloidal silica was added during surface crosslinking in Example 1.

Example 4

Super absorbent polymer was prepared by the same method as Example 1, except that 0.1 parts by weight of colloidal silica was added during surface crosslinking in Example 1.

Example 5

Super absorbent polymer was prepared by the same method as Example 2, except that 0.03 parts by weight of fumed silica was added during surface crosslinking in Example 2.

Example 6

Super absorbent polymer was prepared by the same method as Example 2, except that 0.1 parts by weight of fumed silica was added during surface crosslinking in Example 2.

Comparative Example 1

Super absorbent polymer was prepared by the same method as Example 1, except that colloidal silica was not added during coarse grinding in Example 1.

Comparative Example 2

Super absorbent polymer was prepared by the same method as Example 2, except that colloidal silica was not added during coarse grinding in Example 2.

Comparative Example 3

Super absorbent polymer was prepared by the same method as Example 1, except that instead of adding colloidal silica during coarse grinding, based on 100 parts by weight of neutralized acrylic acid, 0.1 parts by weight of colloidal silica was added to the monomer composition, and polymerization was progressed, and that colloidal silica was not added during surface crosslinking in Example 1.

Comparative Example 4

Super absorbent polymer was prepared by the same method as Example 1, except that instead of adding colloidal silica during coarse grinding, based on 100 parts by weight of neutralized acrylic acid, 0.1 parts by weight of fumed silica was added to the monomer composition, and polymerization was progressed, and that colloidal silica was not added during surface crosslinking in Example 1.

Comparative Example 5

Super absorbent polymer was prepared by the same method as Example 1, except that colloidal silica was not added during surface crosslinking in Example 1.

Comparative Example 6

Super absorbent polymer was prepared by the same method as Example 1, except that during coarse grinding, based on 100 parts by weight of hydrogel polymer, 0.1 parts by weight of fumed silica was added instead of colloidal silica, and that colloidal silica was not added during surface crosslinking in Example 1.

Comparative Example 7

Super absorbent polymer was prepared by the same method as Example 1, except that during coarse grinding, based on 100 parts by weight of hydrogel polymer, 0.1 parts by weight of fumed silica was added instead of colloidal silica in Example 1.

Comparative Example 8

Super absorbent polymer was prepared by the same method as Example 1, except that during coarse grinding, based on 100 parts by weight of hydrogel polymer, 0.1 parts by weight of fumed silica was added instead of colloidal silica, and that during surface crosslinking, based on 100 parts by weight of base resin, 0.05 parts by weight of fumed silica was added in Example 1.

Silica introduction conditions for Examples and Comparative Examples are summarized in the following Table 1.

TABLE 1

| | Polymerization step | Coarse grinding step | Surface crosslinking step |
|---|---|---|---|
| Example 1 | Not introduced | colloidal silica, 0.1 parts by weight | colloidal silica, 0.05 parts by weight |
| Example 2 | Not introduced | colloidal silica, 0.1 parts by weight | fumed silica, 0.05 parts by weight |
| Example 3 | Not introduced | colloidal silica, 0.1 parts by weight | colloidal silica, 0.03 parts by weight |
| Example 4 | Not introduced | colloidal silica, 0.1 parts by weight | colloidal silica, 0.1 parts by weight |
| Example 5 | Not introduced | colloidal silica, 0.1 parts by weight | fumed silica, 0.03 parts by weight |
| Example 6 | Not introduced | colloidal silica, 0.1 parts by weight | fumed silica, 0.1 parts by weight |
| Comparative Example 1 | Not introduced | Not introduced | colloidal silica, 0.05 parts by weight |
| Comparative Example 2 | Not introduced | Not introduced | fumed silica, 0.05 parts by weight |
| Comparative Example 3 | Colloidal silica, 0.1 parts by weight | Not introduced | Not introduced |
| Comparative Example 4 | Fumed silica, 0.1 parts by weight | Not introduced | Not introduced |
| Comparative Example 5 | Not introduced | colloidal silica, 0.1 parts by weight | Not introduced |
| Comparative Example 6 | Not introduced | fumed silica, 0.1 parts by weight | Not introduced |
| Comparative Example 7 | Not introduced | fumed silica, 0.1 parts by weight | colloidal silica, 0.05 parts by weight |
| Comparative Example 8 | Not introduced | fumed silica, 0.1 parts by weight | fumed silica, 0.05 parts by weight |

Experimental Example

For the super absorbent polymers prepared in Examples and Comparative Examples, the properties were evaluated as follows.

Unless otherwise indicated, all the following property evaluations were progressed at constant temperature and constant humidity (23±1° C., relative humidity 50±10%), and physiological saline or brine means a 0.9 wt % sodium chloride (NaCl) aqueous solution.

And, unless otherwise described, the property evaluation of base resin before surface crosslinking was conducted for resin classified with ASTM standard sieve and having particle diameter of 300 μm~600 μm, and the property evaluation of the final surface crosslinked super absorbent polymer was conducted for polymer classified with ASTM standard sieve and having particle diameter of 150 μm~850 μm.

(1) Centrifuge Retention Capacity (CRC)

For each polymer, centrifuge retention capacity by absorption rate under no load was measured according to EDANA WSP 241.3.

Specifically, $W_0$(g) (about 0.2 g) of the super absorbent polymer was uniformly put in an envelope made of non-woven fabric and the envelope was sealed, and then, it was immersed in physiological saline (0.9 wt %) at room temperature. After 30 minutes, the envelope was drained for 3 minutes at 250 G using a centrifuge, and the weight $W_2$(g) of the envelope was measured. And, after the same operation without using polymer, the weight $W_1$(g) at that time was measured. Using obtained weights, CRC (g/g) was calculated according to the following Mathematical Formula 1.

$$\text{CRC(g/g)}=\{[W_2(\text{g})-W_1(\text{g})]/W_0(\text{g})\}-1 \quad \text{[Mathematical Formula 1]}$$

(2) Absorbency Under Pressure (AUP)

For each polymer, absorbency under pressure of 0.7 psi was measured according to EDANA method WSP 242.3.

Specifically, on the bottom of a plastic cylinder having an inner diameter of 60 mm, a 400 mesh wire netting made of stainless steel was installed. Under conditions of room temperature and 50% humidity, $W_0$(g) (0.9 g) of the super-absorbent polymer uniformly spread on the wire netting, and a piston having an outer diameter slightly smaller than 60 mm, capable of further applying 0.7 psi load, was put thereon such that there was no gap between the piston and the inner wall of the cylinder and up down movement was not hindered. At this time, the weight $W_3$(g) of the apparatus was measured.

Inside a petri dish having a diameter of 150 mm, a glass filter having a diameter of 90 mm and a thickness of 5 mm was put, and physiological saline consisting of 0.9 wt % sodium chloride was poured to the same level as the upper surface of the glass filter. One piece of a filter paper having a diameter of 90 mm was put thereon. On the filter paper, the above measuring apparatus was put, and the liquid was absorbed under load for 1 hour. After 1 hour, the measuring apparatus was lifted, and the weight $W_4$(g) was measured.

Using obtained weights, absorbency under pressure(g/g) was calculated according to the following Mathematical Formula 2.

$$\text{AUP(g/g)}=[W_4(\text{g})-W_3(\text{g})]/W_0(\text{g}) \quad \text{[Mathematical Formula 2]}$$

(3) Permeability

Permeability was measured according to a method described in U.S. Pat. No. 9,656,242 B2.

The apparatus for measuring permeability is a chromatography tube having an inner diameter of 20 mm and equipped with a glass filter on the bottom. While a piston was put in the chromatography tube, lines were marked at the liquid surfaces at which the amounts of liquid were 20 ml and 40 ml, respectively. And then, between the glass filter and coke at the bottom of the chromatography tube, water was inversely introduced so as not to generate bubbles, to fill about 10 ml, and the chromatography tube was washed with brine 2~3 times, and 0.9% brine was filled above 40 ml. A piston was put in the chromatography tube, the lower valve was opened, and a time(B) during which the liquid surface decreased from 40 ml line to 20 ml line was recorded.

10 ml of brine was left in the chromatography tube, 0.2±0.0005 g of classified (300 μm~600 μm) super absorbent polymer sample was put, and brine was added to 50 ml, and then, left for 30 minutes. And then, a piston with weights (0.3 psi=106.26 g) was put in the chromatography tube and left for 1 minute, and then, a valve at the lower part of the chromatography tube was opened, and a time(T1) during which the liquid surface decreased from 40 ml line to 20 ml line was recorded, and T1−B (unit: seconds) was calculated.

(4) Vortex Time

A vortex time was measured according to a method described in International Publication No. 1987-003208 as a unit of seconds.

Specifically, in 50 mL of physiological saline of 23° C. to 24° C., 2 g of super absorbent polymer was added, it was stirred with a magnetic bar (diameter 8 mm, length 30 mm) at 600 rpm, and a time taken until vortex disappeared was measured as a unit of seconds, thus calculating a vortex time.

(5) Anti-Caking Efficiency

The weight of a Petri-dish with a diameter of 9 cm was measured and recorded(W1). On the Petri-dish, 2±0.01 g of super absorbent polymer sample was weighed and uniformly scattered, and it was put in a constant temperature constant humidify chamber set to 40° C. temperature and 80% RH humidity, and left for 10 minutes. After 10 minutes, the Petri-dish was taken out and turned upside down on a A4 paper, and left for 5 minutes. After 5 minutes, the weight(S1) of samples fallen at the bottom and the weight (S2) of the Petri-dish were measured and recorded. Using the measurement values, anti-caking efficiency (A/C efficiency) was calculated according to the following Mathematical Formula 3.

$$\text{Anti-caking efficiency}(\%)=[S1/(S2-W1)+S1]\times 100 \quad \text{[Mathematical Formula 3]}$$

(6) Gel Strength

In a beaker with a capacity of 100 ml, 2.5±0.01 g of super absorbent polymer sample was metered and uniformly scattered, and 50 ml of a mixed solution in which ascorbic acid was dissolved in physiological saline (0.9 wt % brine) at the concentration of 0.005 wt %, was added. The beaker containing swollen super absorbent polymer was covered with wrap, and then, put in an oven set to a temperature of 40° C., to degrade for 24 hours. After 24 hours, the beaker was taken out, and put on a stand(FGS-50E-H, SHIMPO Corporation, Japan) for measuring gel strength, and a pressure was applied to the swollen super absorbent polymer inside the beaker with a tension and compression tester attached to the stand(FGS-50E-H, SHIMPO Corporation, Japan). Wherein, the value marked in the tension and compression tester was recorded as gel strength.

The property values of Examples and Comparative Examples are described in the following Table 2.

TABLE 2

| | Based resin before surface crosslinking | | Super absorbent polymer after surface crosslinking | | | | | |
|---|---|---|---|---|---|---|---|---|
| | CRC | Gel strength | CRC | 0.7 psi AUP | Anti-caking Unit | Gel strength | Permeability | Vortex |
| | g/g | N | g/g | g/g | % | N | seconds | Seconds |
| Example 1 | 53.8 | 0.16 | 36.4 | 22.5 | 88.7 | 0.78 | 43 | 41 |
| Example 2 | 53.8 | 0.16 | 38.3 | 21.0 | 89.9 | 0.76 | 45 | 40 |
| Example 3 | 53.8 | 0.16 | 36.3 | 22.4 | 88.5 | 0.77 | 44 | 41 |
| Example 4 | 53.8 | 0.16 | 37.1 | 22.2 | 89.0 | 0.82 | 38 | 40 |
| Example 5 | 53.8 | 0.16 | 38.2 | 21.1 | 89.7 | 0.75 | 45 | 41 |
| Example 6 | 53.8 | 0.16 | 38.3 | 21.3 | 90.1 | 0.79 | 41 | 40 |
| Comparative Example 1 | 52.9 | 0.08 | 36.2 | 21.8 | 72.1 | 0.52 | 80 | 43 |
| Comparative Example 2 | 52.9 | 0.08 | 37.4 | 19.8 | 78.1 | 0.42 | 85 | 45 |
| Comparative Example 3 | 52.5 | 0.1 | 37.7 | 22.1 | 80.9 | 0.48 | 141 | 44 |
| Comparative Example 4 | 51.6 | 0.1 | 37.7 | 18.1 | 83.1 | 0.45 | 94 | 44 |
| Comparative Example 5 | 53.8 | 0.16 | 37.8 | 25.3 | 83.1 | 0.77 | 48 | 42 |
| Comparative Example 6 | 50.4 | 0.15 | 37.6 | 26.5 | 92.3 | 0.71 | 59 | 45 |
| Comparative Example 7 | 50.4 | 0.15 | 36.9 | 19.6 | 90.8 | 0.73 | 53 | 48 |
| Comparative Example 8 | 50.4 | 0.15 | 37.8 | 19.1 | 92.8 | 0.69 | 64 | 40 |

Referring to Table 2, it was confirmed that Examples 1 to 6 of the invention exhibited high gel strength, excellent absorption properties, vortex time, permeability and anti-caking efficiency.

Meanwhile, it can be seen that in Comparative Examples 1 to 4 wherein colloidal silica was not added during coarse grinding, low gel strength and anti-caking efficiency were exhibited, and furthermore, permeability was inferior to Examples.

In Comparative Example 5 wherein silica was not introduced during surface crosslinking, permeability and anti-caking efficiency were low, and in Comparative Examples 6 to 8 wherein fumed silica was introduced instead of colloidal silica during coarse grinding, gel strength and permeability were low.

What is claimed is:

1. A method for preparing a super absorbent polymer, the method comprising steps of:

conducting photopolymerization or thermal polymerization of a monomer composition comprising acrylic acid-based monomers having acid groups, at least a part of said acid groups being neutralized, an internal crosslinking agent, and a polymerization initiator to form a hydrogel polymer;

adding colloidal silica to the hydrogel polymer, and mixing the hydrogel polymer with the colloidal silica and conducting coarse grinding to form a coarsely ground hydrogel polymer;

drying, grinding and classifying the coarsely ground hydrogel polymer to form a base resin; and mixing the base resin with a surface crosslinking solution comprising one of additional colloidal silica or fumed silica, and a surface crosslinking agent, and crosslinking a surface of the base resin to form a surface crosslink layer in which the additional colloidal silica or fumed silica is distributed.

2. The method for preparing super absorbent polymer according to claim 1, wherein in the step of adding colloidal silica to the hydrogel polymer, the colloidal silica is included in a content of 0.01 to 1.0 part by weight, based on 100 parts by weight of the hydrogel polymer.

3. The method for preparing super absorbent polymer according to claim 1, wherein in the step of crosslinking the surface of the base resin to form a surface crosslink layer, the colloidal silica or fumed silica is included in a content of 0.01 to 1.0 part by weight, based on 100 parts by weight of the base resin.

4. The method for preparing super absorbent polymer according to claim 1, wherein the base resin has a gel strength measured according to tension and compression test, of 0.1N or more.

5. The method for preparing super absorbent polymer according to claim 1, wherein the base resin has a centrifuge retention capacity (CRC) measured according to EDANA method WSP 241.3, of 45 g/g or more.

6. The method for preparing super absorbent polymer according to claim 1, wherein the super absorbent polymer has a centrifuge retention capacity (CRC) measured according to EDANA method WSP 241.3, of 35 g/g or more.

7. The method for preparing super absorbent polymer according to claim 1, wherein the super absorbent polymer has an absorbency under pressure (AUP) of 0.7 psi, measured according to EDANA method WSP 242.3, of 20 g/g or more.

8. The method for preparing super absorbent polymer according to claim 1, wherein the super absorbent polymer has a permeability (unit: seconds) of 50 seconds or less.

9. The method for preparing super absorbent polymer according to claim 1, wherein the super absorbent polymer has a vortex time, of 45 seconds or less, wherein the vortex time is time taken until vortex of liquid disappears by rapid absorption, when the super absorbent polymer is added to a physiological saline and stirred.

10. The method for preparing super absorbent polymer according to claim 1, wherein the super absorbent polymer has an anti-caking efficiency of 88.0% or more.

11. The method for preparing super absorbent polymer according to claim 1, wherein the super absorbent polymer has a gel strength measured according to tension and compression test, of 0.70N or more.

12. The method for preparing super absorbent polymer according to claim 1, wherein the acrylic acid-based monomers are included in a content of about 20 to about 60 wt %, based on the monomer composition.

13. The method for preparing super absorbent polymer according to claim 1, wherein the hydrogel polymer formed in the photopolymerization or thermal polymerization has a particle diameter of 2 to 50 mm.

14. The method for preparing super absorbent polymer according to claim 1, wherein the coarsely ground hydrogel polymer has a particle diameter of 2 to 10 mm.

15. The method for preparing super absorbent polymer according to claim 1, wherein the base resin has particles having a particle diameter of 150 μm to 850 μm.

16. The method for preparing super absorbent polymer according to claim 1, wherein the surface crosslinking agent is included in a content of 0.001 to 5 parts by weight, based on 100 parts by weight of the base resin.

* * * * *